United States Patent
Livanos

(10) Patent No.: US 8,325,674 B2
(45) Date of Patent: Dec. 4, 2012

(54) METHOD OF INTEGRATING FEMTOCELLS IN A PACKET CABLE MULTIMEDIA ARCHITECTURE

(75) Inventor: Konstantin Livanos, Naperville, IL (US)

(73) Assignee: Alcatel Lucent, Paris (FR)

( * ) Notice: Subject to any disclaimer, the term of this patent is extended or adjusted under 35 U.S.C. 154(b) by 814 days.

(21) Appl. No.: 12/036,769

(22) Filed: Feb. 25, 2008

(65) Prior Publication Data

US 2009/0109922 A1 Apr. 30, 2009

Related U.S. Application Data

(60) Provisional application No. 60/983,942, filed on Oct. 31, 2007.

(51) Int. Cl.
*H04W 4/00* (2009.01)
(52) U.S. Cl. ........ 370/331; 370/328; 370/329; 370/332; 370/333; 370/334; 370/401; 455/436; 455/437; 455/438; 455/439; 455/440; 455/441; 455/442; 455/443; 455/444
(58) Field of Classification Search .................. 370/310, 370/328, 329, 331
See application file for complete search history.

(56) References Cited

U.S. PATENT DOCUMENTS

| | | | |
|---|---|---|---|
| 6,442,158 B1 * | 8/2002 | Beser | 370/352 |
| 7,171,678 B2 * | 1/2007 | Buehl et al. | 725/87 |
| 2002/0013844 A1 * | 1/2002 | Garrett et al. | 709/225 |
| 2005/0265312 A1 * | 12/2005 | Thermond | 370/352 |
| 2006/0114855 A1 | 6/2006 | Zheng | 370/331 |
| 2008/0076420 A1 | 3/2008 | Khetawat et al. | 455/435.1 |
| 2008/0096553 A1 * | 4/2008 | Saksena et al. | 455/426.2 |
| 2008/0248807 A1 | 10/2008 | Kim et al. | 455/453 |
| 2008/0293418 A1 * | 11/2008 | Choksi et al. | 455/436 |
| 2009/0061873 A1 * | 3/2009 | Bao et al. | 455/436 |
| 2009/0156213 A1 * | 6/2009 | Spinelli et al. | 455/436 |

FOREIGN PATENT DOCUMENTS

WO WO 2004/112302 A2 12/2004

OTHER PUBLICATIONS

International PCT Search Report PCT/US2008/012164 dated Feb. 23, 2009.
Written Opinion—PCT/US2008/012164 Mar. 5, 2009.
"3GPP TS 23.203 V7.10. $3^{rd}$ Generation Partnership Project; Technical Specification Group Services and System Aspects; Policy and Charging Control Architecture (Release 7)" Dec. 1, 2006, pp. 1-7 XP002492478.

* cited by examiner

*Primary Examiner* — Hassan Phillips
*Assistant Examiner* — Gautam Sharma
(74) *Attorney, Agent, or Firm* — Williams, Morgan & Amerson

(57) ABSTRACT

The present invention provides a method for implementation in a cable modem termination system that is communicatively coupled to a first wireless access device configured to provide wireless connectivity to at least one mobile unit. The method includes receiving a request to allocate resources to the first wireless access device for a wireless connection to the mobile unit. The requested resources are determined based upon a quality of service associated with the mobile unit. The method also includes determining whether to grant the request for the resources based on policy information received from a policy server and providing information indicating whether the requested resources have been granted.

18 Claims, 5 Drawing Sheets

METHOD OF INTEGRATING FEMTOCELLS IN A PACKET CABLE MULTIMEDIA ARCHITECTURE

This application claims priority from prior copending U.S. provisional patent application Ser. No. 60/983,942, filed on Oct. 31, 2007.

BACKGROUND OF THE INVENTION

1. Field of the Invention

This invention relates generally to communication systems, and, more particularly, to communication systems.

2. Description of the Related Art

Service providers typically provide numerous voice and/or data services to subscribers using one or more wired and/or communication systems. Exemplary services include cellular telephony, access to the Internet, gaming, broadcasting or multicasting of audio, video, and multimedia programming, and the like. Mobile subscriber units such as cell phones, personal data assistants, smart phones, pagers, text messaging devices, global positioning system (GPS) devices, network interface cards, notebook computers, and desktop computers may access the services provided by the communication systems over an air interface with a base station, base station router, or femtocell. The services are provided according to established and/or negotiated policies and the service providers typically charge the end-users for the services that are provided. For example, a cellular telephone service provider may charge an end-user for each minute of airtime that is used during voice communications. The billing rate may be determined based on a negotiated policy indicating the quality of service to be provided to the end user. For another example, end-users may be charged for each byte of data that is transmitted and/or received by the mobile unit operated by the end-user. Consequently, communication systems implement various charging and policy control architectures.

Conventional communication systems use a network of base stations to provide wireless connectivity to one or more mobile units. In some cases, the mobile units may initiate wireless communication with one or more base stations in the network, e.g., when the user of the mobile unit would like to initiate a voice or data call. Alternatively, the network may initiate the wireless communication link with the mobile unit. For example, in conventional hierarchical wireless communications, a server transmits voice and/or data destined for a target mobile unit to a central element such as such as a Radio Network Controller (RNC). The RNC may then transmit paging messages to the target mobile unit via one or more base stations. The target mobile unit may establish a wireless link to one or more of the base stations in response to receiving the page from the communication system. A radio resource management function within the RNC receives the voice and/or data and coordinates the radio and time resources used by the set of base stations to transmit the information to the target mobile unit. The radio resource management function can perform fine grain control to allocate and release resources for broadcast transmission over a set of base stations.

One alternative to the conventional hierarchical network architecture is a distributed architecture including a network of access points, such as base station routers, that implement distributed communication network functionality. For example, each base station router may combine RNC and/or PDSN functions in a single entity that manages radio links between one or more mobile units and an outside network, such as the Internet. Base station routers wholly encapsulate the cellular access technology and may proxy functionality that utilizes core network element support to equivalent IP functions. For example, IP anchoring in a UMTS base station router may be offered through a Mobile IP Home Agent (HA) and the GGSN anchoring functions that the base station router proxies by through equivalent Mobile IP signaling. Compared to hierarchical networks, distributed architectures have the potential to reduce the cost and/or complexity of deploying the network, as well as the cost and/or complexity of adding additional wireless access points, e.g. base station routers, to expand the coverage of an existing network. Distributed networks may also reduce (relative to hierarchical networks) the delays experienced by users because packet queuing delays at the RNC and PDSN of hierarchical networks may be reduced or removed.

At least in part because of the reduced cost and complexity of deploying a base station router, base station routers may be deployed in locations that are impractical for conventional base stations. For example, a base station router may be deployed in a residence or building to provide wireless connectivity to the occupants of the residents or the building. Base station routers deployed in a residence are typically referred to as home base station routers or femtocells because they are intended to provide wireless connectivity to a small area that encompasses a residence. However, the functionality in a home base station router is typically quite similar to the functionality implemented in a conventional base station router that is intended to provide wireless connectivity to a macro-cell that may cover an area of approximately a few square kilometers. One important difference between a home base station router and a conventional base station router is that home base station routers are designed to be plug-and-play devices that can be purchased off-the-shelf and easily installed by a lay person.

Femtocells are typically connected to the outside network using the user's existing home network infrastructure, such as a cable modem. Other entities may also use the home network infrastructure to access the outside network. For example, the home network may include one or more computers that are coupled to the cable modem via routers and/or wireless access points. In some cases, the cable modem may also be used to provide cable television services, video-on-demand services, telephone service, and the like. Consequently, a mobile unit must compete with these devices for resources when the mobile unit originates a call via the femtocell, receives a call via the femtocell, and/or hands off between the femtocell and the macro-cellular network. Conventional cable modem architectures, such as DOCSIS, only provide basic routing functions for the devices that are coupled to the cable modem. Conventional cable modems are not able to control the resources allocated to the femtocell according to established and/or negotiated policies associated with the mobile unit. This may lead to overloading of the DOCSIS network, which may degrade the quality of the connections associated with all of the applications connected to the cable modem.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for implementation in a cable modem termination system that is communicatively coupled to a first wireless access device configured to provide wireless connectivity to at least one mobile unit. The method includes receiving a request to allocate resources to the first wireless access device for a wireless connection to the mobile unit. The requested resources are determined based upon a quality of service associated with the mobile unit. The method also includes determining whether to grant the request for the resources based on policy information received from a policy server and providing information indicating whether the requested resources have been granted.

BRIEF DESCRIPTION OF THE DRAWINGS

The invention may be understood by reference to the following description taken in conjunction with the accompanying drawings, in which like reference numerals identify like elements, and in which.

Figure 1:
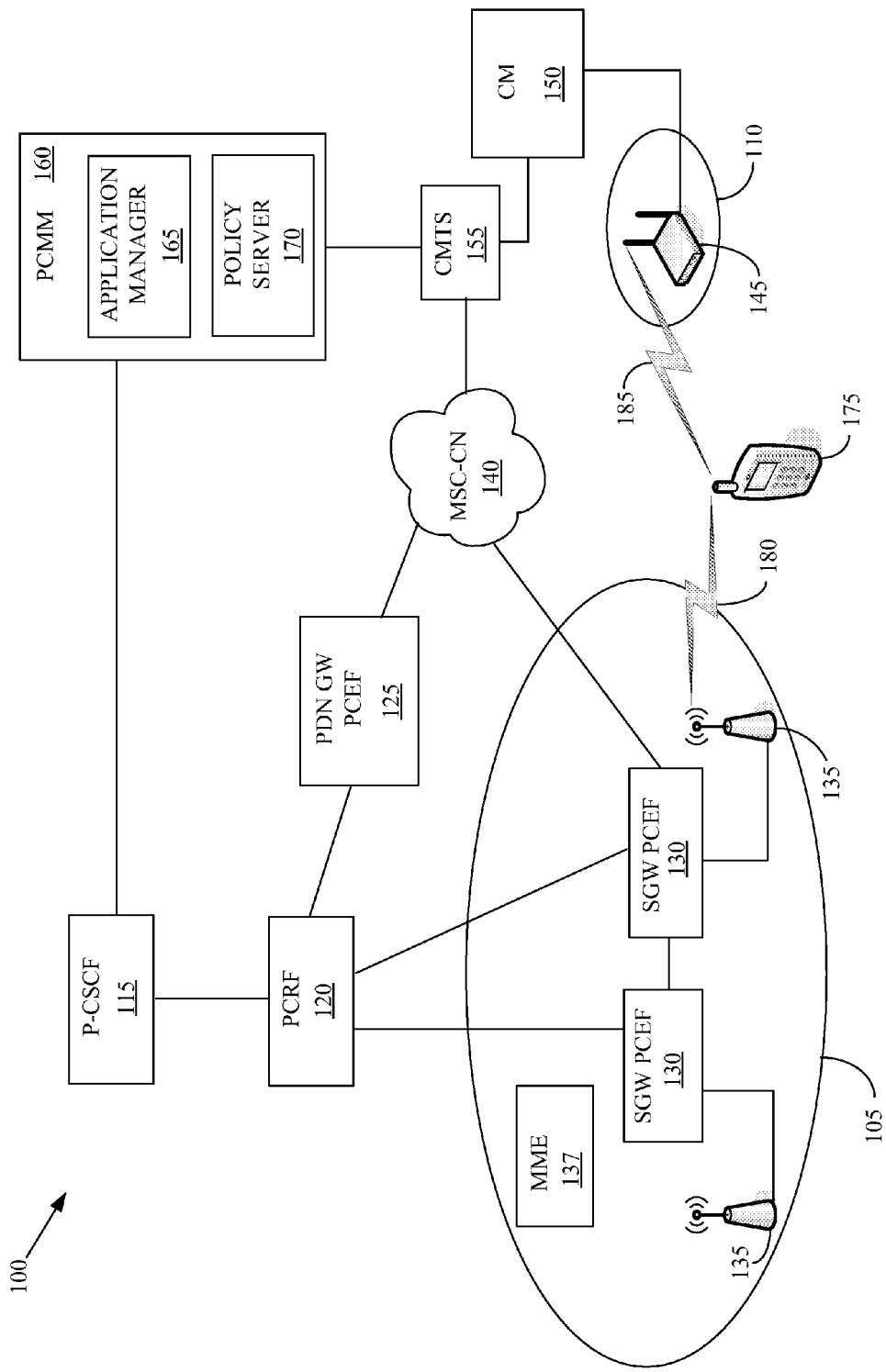
FIG. 1 conceptually illustrates a one exemplary embodiment of a wireless communication network, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates one exemplary embodiment of a communication system 100. In the illustrated embodiment, the communication system 100 implements a policy and charging control architecture that performs dynamic policy and/or charging control. Portions of the communication system 100 may operate in accordance with the Universal Mobile Telecommunication System (UMTS) standards and/or protocols and, in particular, the Long Term Evolution (LTE) of the UMTS. Although not depicted in FIG. 1, portions of the communication system 100 may alternatively operate in accordance with WiMAX standards as defined in the WiMAX forum. However, the present invention is not limited to communication systems 100 that operate in accordance with the UMTS, LTE, and/or WiMAX standards. For example, in alternative embodiments, some or all of the communication system 100 may operate according to one or more other radio access technologies such as Code Division Multiple Access/Ultra-Mobile Broadband (CDMA/JMB). Furthermore, the communication system 100 implements policy control and charging functionality that is not set forth in the 3GPP Technical Specification 23.203. In particular, embodiments of the communication system 100 implement mobility-aware policy and charging control as discussed herein.

The communication system 100 provides wireless connectivity via macrocells 105 and femtocells 110. Macrocells 105 and femtocells 110 are typically distinguished based on the size of the cell. For example, macrocells 105 typically cover areas on the order of a few to several square kilometers and femtocells 110 typically cover areas on the order of a several square meters. In the illustrated embodiment, the communication system 100 includes a proxy call session control function (P-CSCF) 115. The P-CSCF 115 is a known entity in WiMAX and other networks and in the interest of clarity only those aspects of the operation of the P-CSCF 115 that are relevant to the present invention will be discussed herein. The P-CSCF 115 is communicatively coupled to a policy control and charging rules function (PCRF) 120 over an Rx interface. The PCRF 120 provides network control rules regarding the service data flow detection, gating, and quality of service and/or flow-based charging. For example, the PCRF 120 can determine various policy and charging control (PCC) rules. In some cases, the PCRF 120 determines the PCC rules based upon subscription information associated with a subscriber and stored in a subscription profile repository (not shown).

The PCC rules may be transmitted over a Gx/Ty interface towards a policy control and enforcement function (PCEF) 125. In the illustrated embodiment, the PCEF 125 resides in a packet data node gateway (PDN-GW) that may be part of an access serving network (not shown in FIG. 1) of the communication system 100. For example, the PCEF 125 may be located in the GGSN for a GPRS network and the PDG for a WLAN. Alternatively, in a system that operates according to the Third Generation Partnership Project 2 (3GPP2) standards, the PCEF 125 could be located in a packet data serving node (PDSN) that is implemented in a gateway entity. The PCRF 120 may also transmit the PCC rules towards serving gateways of the macrocell 105 that implement policy control and enforcement functions (SGW PCEF) 130. The PDN-GW PCEF 125 and/or the SGW PCEF 130, in conjunction with an online charging system and/or an off-line charging system, implement service data flow detection, policy enforcement, and flow-based charging functionalities in accordance with the PCC/CC rules established by the PCRF 120. For example, the PDN-GW PCEF 125 and/or the SGW PCEF 130 may implement gate enforcement, quality of service enforcement, and charging control using the PCC/CC rules associated with subscribers to various services to ensure proper deployment and enforcement of quality of service policies and accurate charging for macro and femtocells. In the illustrated embodiment, the PDN-GW PCEF 125 and/or the SGW PCEF 130 communicate with each other and/or with other entities in the wireless communication system via an MSO core network 140.

The macrocell 105 includes base stations 135 that are communicatively coupled to a mobility management entity (MME) 137. In the illustrated embodiment, the various interconnections between the mobility management entity 137 and other elements of the wireless communication system 100 are not explicitly depicted so as not to unnecessarily obscure the drawing. In the illustrated embodiment, the SGW PCEF entity 130 communicates with the PCRF function 120 over the Gx interface and the PDN-GW PCEF 125 over IETF mobility interfaces. The SGW PCEF entity 130 may also communicate with the PCEF 125 via the MSO-CN 140 in the communication system 100 using router interfaces. Techniques for implementing and/or operating the base stations 135, the PDN-GW PCEF 125, the SGW PCEF 130, and the mobility management entity 137 are known in the art and in the interest of clarity only those aspects of implementing and/or operating the base stations 135, the PDN-GW PCEF 125, the SGW PCEF 130, and the mobility management entity 137 that are relevant to the present invention will be discussed herein.

The communication system 100 also includes one or more home base station routers 145 for providing wireless connectivity within the femtocell 110. Persons of ordinary skill in the art having benefit of the present disclosure should appreciate that the home base station router 145 may also be referred to as a femtocell 145 in accordance with common usage in the art. However, in the interest of clarity and to avoid confusion with the geographical area known as the femtocell 110, the term "home base station router" may be used in the present application to indicate the wireless communication device. The home base station router 145 may provide wireless connectivity according to standards and/or protocols including, but not limited to, Universal Mobile Telecommunication Services (UMTS) standards and/or protocols, Global System for Mobile communication (GSM) standards and/or protocols, WiMAX standards and/or protocols, IEEE standards and/or protocols, and the like. Furthermore, persons of ordinary skill in the art having benefit of the present disclosure should appreciate that the present invention is not limited to using home base station routers 145 to provide wireless connectivity. In alternative embodiments, devices such as base stations, base station routers, access points, access networks, and the like may be used to provide wireless connectivity in the communication system 100.

In the illustrated embodiment, the home base station router 145 is coupled to a cable modem (CM) 150, which is used to provide access to the communication system 100. The cable modem 150 is controlled by a cable modem termination system (CMTS) 155, which is in communication with a packet cable multimedia (PCMM) entity 160. For example, the cable modem 150 and CMTS 155 may be part of a DOCSIS network that communicates with the PCMM 160. The cable modem termination system 155 controls operation of the cable modem 150 including coordinating allocation of resources to the various devices that are accessing the communication system 100 via the cable modem 150. For example, in addition to the home base station router 145, the cable modem 150 may also be providing network access to other devices such as telephones, computers, televisions, and the like. The cable modem termination system 155 may therefore be configured to operate in conjunction with an application manager 165 and a policy server 170 in the packet cable multimedia entity 160 to determine resource allocations for the devices that are coupled to the cable modem 150. The cable modem termination system 155 may also be configured to communicate with the mobility management entity 137 via the core network 140. For example, the DOCSIS network (e.g., the CMTS 155 and CM 150) may provide connectivity using standard routing to the macro network 105 via the MSC-CN 140. In that case, the signaling connection terminates at the MME 137 and the bearer connection at the source SGW 130.

One or more mobile units 175 may access the communication system 100 by forming wireless communication links over air interfaces 180, 185 with the base stations 135 and/or the home base station router 145. In operation, the mobile unit 175 may originate (or hand off) calls over the air interface 180 or the air interface 185. The call may be established at a selected quality-of-service (QoS) level, such as a quality-of-service level that is determined by a user subscription and/or a user profile. The quality-of-service level may indicate that the mobile unit 175 is guaranteed a certain level of service for calls within the communication system 100. Exemplary quality-of-service levels include gate control, bandwidths, error rates, bit rates, and the like. If the QoS call is originated at (or handed off to) the home base station router 145, then the home base station router requests the necessary QoS resources and the cable modem termination system 155 may be configured to coordinate allocation of the requested resources of the cable modem 150 to support the QoS call. For example, the home base station router 145 may request the bandwidth required to support the requested the QoS call and the CMTS 155 may process this request and forward it to the policy server 170 in the PCMM 160. If the policy server 170 approves the request, then the cable modem termination system 155 may admit the QoS call. However, if the requested bandwidth is not available, then the cable modem termination system 155 may reject the QoS call. The cable modem termination system 155 may also coordinate release of the resources of the cable modem 150 when a QoS call is terminated and/or handed off to one of the macro-cellular base stations 135.

Figure 2:
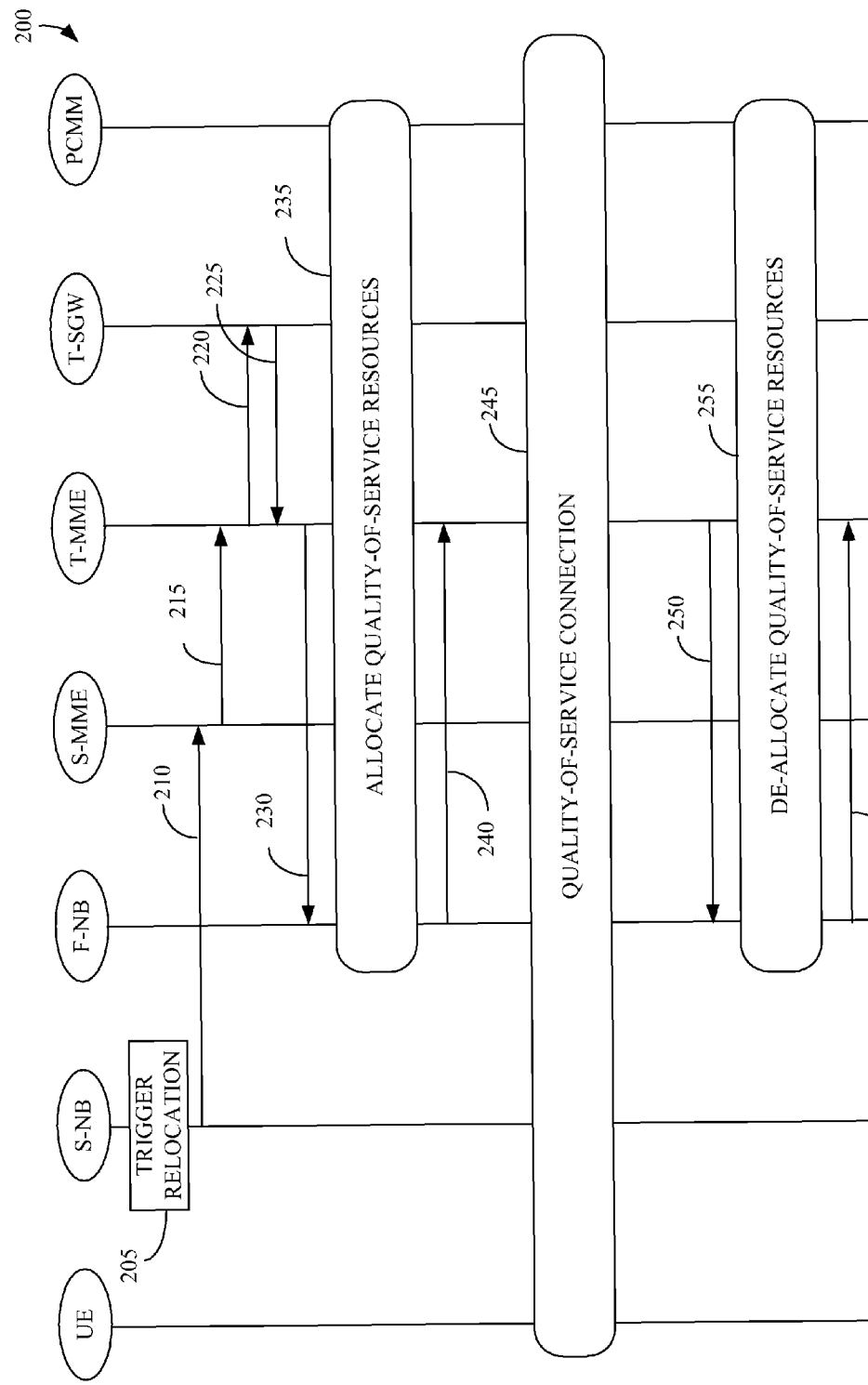
FIG. 2 conceptually illustrates one exemplary embodiment of a method for relocating or handing off user equipment from a macro cellular source node-B to a target femtocell node-B, in accordance with the present invention.

FIG. 2 conceptually illustrates one exemplary embodiment of a method 200 for relocating or handing off user equipment (UE) from a macro cellular source node-B (S-NB) to a target femtocell node-B (F-NB). The exemplary embodiment of the communication system of method 200 also includes mobile management entities (S-MME, T-MME) associated with both the macro cellular source node-B (S-NB) and the target femtocell node-B (F-NB), a target serving gateway (T-SGW), and a packet cable multimedia (PCMM) entity. In the illustrated embodiment, the source node-B (S-NB) triggers (at 205) relocation of the user equipment from the macrocell to the femtocell. Triggering (at 205) of the relocation may be based upon measurements performed at the user equipment (i.e., the handoff may be mobile unit initiated) and/or measurements performed by the source node-B (i.e., the handoff may be network initiated). The source node-B (S-NB) may then transmit a relocation request to the source mobility management entity (S-MME), as indicated by the arrow 210. The relocation request is a message or signal that indicates that the user equipment (UE) is attempting to handoff from the macro cellular source node-B (S-NB) to the target femtocell node-B (F-NB). The source mobility management entity (S-MME) forwards the relocation request to the target mobility management entity (T-MME), as indicated by the arrow 215.

The target mobility management entity (T-MME) may also establish a bearer in preparation for the handoff. In the illustrated embodiment, the target mobility management entity (T-MME) transmits a request to establish the bearer to the target serving gateway (T-SGW), as indicated by the arrow 220. The target serving gateway (T-SGW) may then acknowledge receipt of the request and creation of the bearer by transmitting a response message, as indicated by the arrow 225. A relocation request may then be transmitted from the target mobility management entity (T-MME) to the target node-B (F-NB), as indicated by the arrow 230. In response to receiving the relocation request, the target node-B (F-NB) initiates a procedure for allocating (at 235) resources in the DOCSIS network to the call session associated with the user equipment (UE). Once the quality of service resources have been allocated (at 235), the target node-B (F-NB) transmits an acknowledgment message indicating that resources for the handed over call session are available, as indicated by the arrow 240. Handoff of the user equipment (UE) and establishment of the call session may then proceed (at 245) according to conventional techniques.

Figure 3:
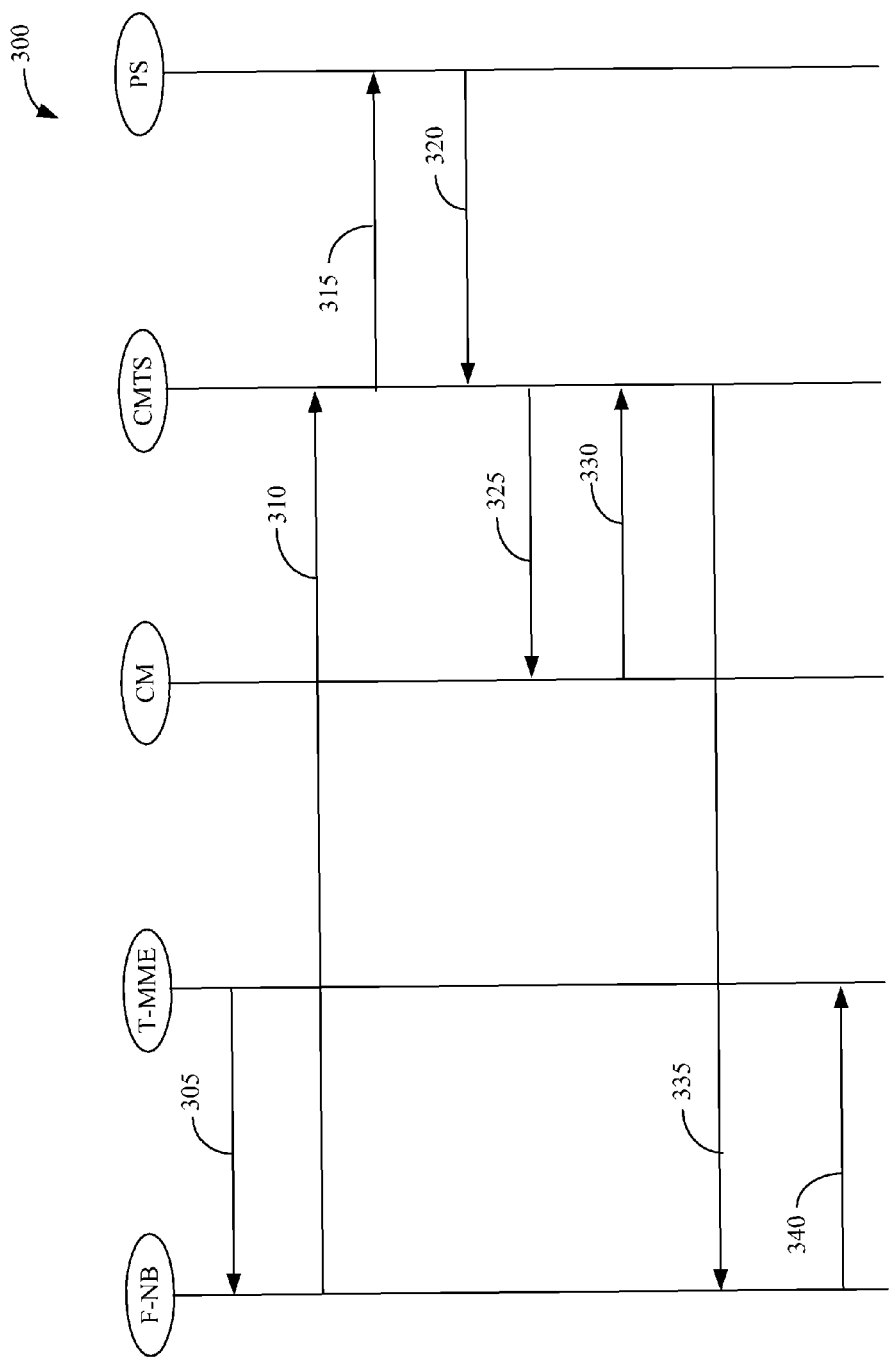
FIG. 3 conceptually illustrates one exemplary embodiment of a method of allocating resources to a femtocell for handoff of user equipment from a macrocell to the femtocell, in accordance with the present invention.

FIG. 3 conceptually illustrates one exemplary embodiment of a method 300 of allocating resources to a femtocell (F-NB) associated with a cable modem (CM) for handoff of user equipment from a macrocell to the femtocell. The method 300 may be used to allocate the resources in step 235 shown in FIG. 2. In the illustrated embodiment, the femtocell (F-NB) receives a relocation request from its associated (target) mobility management entity (T-MME), as indicated by the arrow 305. In response to receiving the relocation request, the femtocell (F-NB) transmits a quality of service request to a cable modem termination system (CMTS). In one embodiment, the quality of service request includes information indicating the resources required to provide the requested quality of service via the cable modem (CM), as indicated by the arrow 310. For example, the femtocell (F-NB) may use a PCMM defined type-3 client such as a RSVP client to determine the amount of resources that would be required to maintain the current quality of service provided to the user equipment. The femtocell (F-NB) may then transmit this information in the quality of service request (at 310).

The cable modem termination system (CMTS) transmits the resource request to a policy server (PS), as indicated by the arrow 315. In one embodiment, the policy server (PS) may be the policy server 170 associated with the packet cable multimedia entity 160 shown in FIG. 1. The policy server (PS) may then determine whether or not to allocate the requested resources. In various embodiments, the policy server (PS) may determine whether to allocate the requested resources based upon the amount of each resource requested, the total available resources of the cable modem (CM), resources currently being utilized by the cable modem (CM) to support other devices, an authorized quality of service level associated with the user equipment, and/or other subscription or profile information associated with user equipment. However, persons of ordinary skill in the art having benefit of the present disclosure should appreciate that the policy server (PS) may use other information, rules, criteria, and the like to coordinate resource allocation for the cable modem (CM), the devices attached to the cable modem (CM), as well as other entities of the communication system 100. The policy server (PS) may then transmit a message to the cable modem termination system (CMTS) indicating whether the requested resources have been allocated, as indicated by the arrow 320.

If the requested resources have been allocated, and the cable modem termination system (CMTS) transmits a request to establish service using the allocated resources, as indicated by the arrow 325. The cable modem (CM) may respond to this request by transmitting a message indicating that the service will be established using the allocated resources, as indicated by the arrow 330. Once the resources have been allocated and the requested service has been established on the cable modem (CM), the cable modem termination system may transmit a request message to the femtocell (F-NB) indicating that the request to hand over the quality of service call has been granted and the necessary resources have been allocated to the cable modem (CM), as indicated by the arrow 335. The femtocell (F-NB) responds by transmitting a message that acknowledges that the relocation request has been granted for the quality of service call associated with the user equipment, as indicated by the arrow 340.

Referring back to FIG. 2, the target mobility management entity (T-MME), which is actually functioning as a "source" MME following handoff of the user equipment (UE) to the femtocell (F-NB), may elect to release the quality of service resources. In various embodiments, the resources may be released because of call termination, handoff to another node-B, or other reasons. The target mobility management entity (T-MME) transmits a de-allocation request to the femtocell (F-NB), as indicated by the arrow 250. The de-allocation request includes information requesting that the femtocell (F-NB) de-allocate the resources that have been used to support the call session with the user equipment (UE). The communication system may then de-allocate (at 255) the quality of service resources associated with the femtocell (F-NB) and the user equipment (UE). Once the quality of service resources have been de-allocated (at 255), the femtocell (F-NB) transmits a message to the target mobility management entity (T-MME) that indicates that the quality of service resources have been successfully de-allocated, as indicated by the arrow 260.

Figure 4:
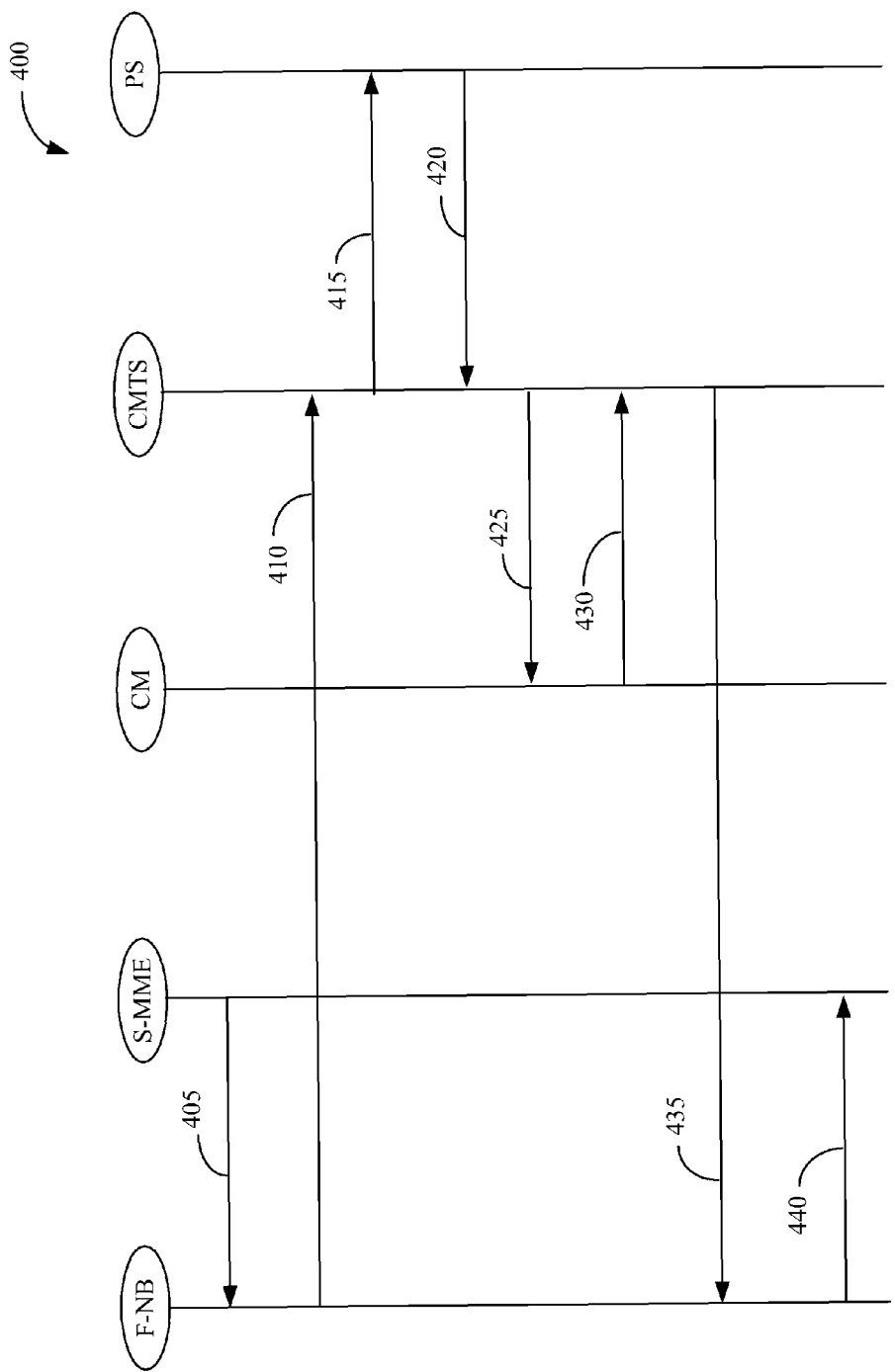
FIG. 4 conceptually illustrates one exemplary embodiment of a method of de-allocating resources that have been allocated to a femtocell associated with a cable modem, in accordance with the present invention.

FIG. 4 conceptually illustrates one exemplary embodiment of a method 400 of de-allocating resources that have been allocated to a femtocell (F-NB) associated with a cable modem (CM). The method 400 may be used to de-allocate the resources in step 255 shown in FIG. 2. In the illustrated embodiment, the femtocell (F-NB) receives a de-allocation request from its associated (source) mobility management entity (S-MME), as indicated by the arrow 405. In response to receiving the de-allocation request, the femtocell (F-NB) transmits a quality of service resource release request to a cable modem termination system (CMTS), as indicated by the arrow 410. In one embodiment, the quality of service resource release request includes information indicating that the previously allocated resources that are being used to provide the requested quality of service via the cable modem (CM) are to be de-allocated, e.g., in response to a handoff request, a termination request, and the like.

The cable modem termination system (CMTS) transmits the resource release request to a policy server (PS), as indicated by the arrow 415. In one embodiment, the policy server (PS) may be the policy server 170 associated with the packet cable multimedia entity 160 shown in FIG. 1. The policy server (PS) may then determine whether or not to de-allocate the requested resources. Providing the release request to the policy server (PS) may allow the policy server (PS) to monitor the total available resources of the cable modem (CM), resources currently being utilized by the cable modem (CM) to support other devices, and/or other resource utilization information. The policy server (PS) may then transmit a message to the cable modem termination system (CMTS) indicating whether the requested resources have been de-allocated, as indicated by the arrow 420.

If the requested resources have been de-allocated, the cable modem termination system (CMTS) transmits a request to tear down the existing connection between the femtocell (F-NB) and the user equipment (UE), as indicated by the arrow 425. The cable modem (CM) may respond to this request by transmitting a message indicating that the service will be torn down, as indicated by the arrow 430. Once the resources have been de-allocated and the connection torn down, the cable modem termination system (CMTS) may transmit a confirmation message to the femtocell (F-NB) indicating that the request to release the quality of service call has been granted and the associated resources have been de-allocated, as indicated by the arrow 435. The femtocell (F-NB) responds by transmitting a message that acknowledges de-allocation of the quality of service resources, as indicated by the arrow 440. In one embodiment, the source mobility management entity may also communicate with the source gateway to delete bearers associated with the quality of service call.

Figure 5:
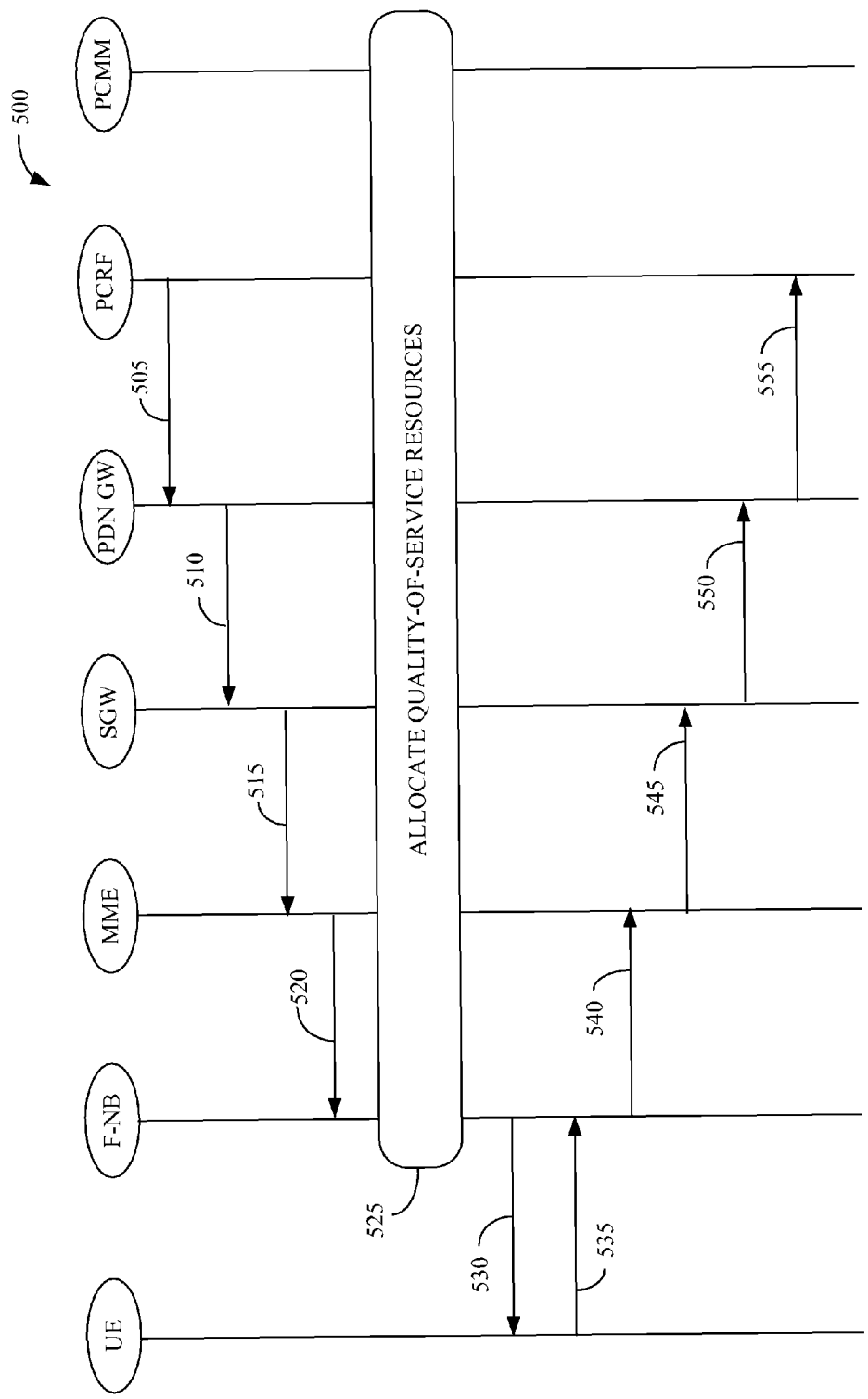
FIG. 5 conceptually illustrates one exemplary embodiment of a method of allocating resources to a femtocell in response to a quality of service call origination request, in accordance with the present invention.

FIG. 5 conceptually illustrates one exemplary embodiment of a method 500 of allocating resources to a femtocell (F-NB) in response to a quality of service call origination request. For example, when user equipment (UE) originates a new quality of service session with the femtocell (F-NB) or receives an incoming quality of service call while connected to the femtocell (F-NB), the femtocell (F-NB) requests allocation of resources from the associated DOCSIS network. In the illustrated embodiment, a PCRF transmits a PCC decision to a packet data network gateway (PDN-GW), as indicated by the arrow 505. The PCC decision includes information indicating any policy control and/or charging rules that have been formulated by the PCRF and should be applied to the requested call. The PDN-GW then transmits a dedicated bearer request to the serving gateway (SGW), as indicated by the arrow 510. The dedicated bearer request includes information indicating that the serving gateway should establish a bearer for the requested call. The server forwards the request to create the dedicated bearer in the mobility management entity (MME), as indicated by the arrow 515.

The mobility management entity (MME) forwards a request to the femtocell (F-NB) to set up the bearer, as indicated by the arrow 520. In response to receiving the request to set up the bearer, the femtocell (F-NB) negotiates allocation of the quality of service resources (at 525). In one embodiment, negotiation (at 525) of the quality of service resource allocation may proceed as depicted in FIG. 3. If resources sufficient to support the requested quality of service call are allocated (at 525), then the femtocell (F-NB) transmits a message to the user equipment requesting that the radio bearer for the quality of service call be established, as indicated by the arrow 530. The user equipment may respond to indicate that the requested radio bearer has been set up, as indicated by the arrow 535. The response may then be forwarded to the mobility management entity (MME), as indicated by the arrow 540, which may transmit a message to the serving gateway indicating that the requested dedicated bearer has been created, as indicated by the arrow 545. The response to the request to create the dedicated bearer may then be forwarded to the PDN-GW and the PCRF, as indicated by the arrows 550 and 555. In one embodiment, resource allocation procedures for the radio bearers and the corresponding DOCSIS resources may be conducted concurrently to reduce setup delays for the new session.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

What is claimed:

1. A method for implementation in a cable modem termination system that is communicatively coupled to a first wireless access device configured to provide wireless connectivity to at least one mobile unit, comprising:

receiving, at the cable modem termination system, a request to allocate cable modem resources to the first wireless access device for a wireless connection to said at least one mobile unit, wherein the first wireless access device determines the cable modem resources necessary to support the wireless connection at a quality of service associated with said at least one mobile unit, and wherein the first wireless access device requests the cable modem resources on behalf of said at least one mobile unit;

determining whether to grant the request for the cable modem resources based on policy information received from a policy server; and providing, from the cable modem termination system to the first wireless access device, information indicating whether the requested cable modem resources have been granted, wherein the first wireless access device initiates the wireless connection to said at least one mobile unit in response to receiving an indication that the requested cable modem resources have been granted.

2. The method of claim 1, wherein receiving the request to allocate cable modem resources comprises receiving the request from the first wireless access device in response to a relocation request from a second wireless access device providing wireless connectivity to said at least one mobile unit for a call session over the wireless connection at the quality of service associated with said at least one mobile unit.

3. The method of claim 1, wherein receiving the request to allocate cable modem resources comprises receiving the request from the first wireless access device in response to a call origination message provided to the first wireless access device by said at least one mobile unit.

4. The method of claim 1, wherein determining whether to grant the request for the cable modem resources comprises providing a request to allocate cable modem resources to the policy server.

5. The method of claim 4, wherein determining whether to grant the request for the cable modem resources comprises receiving a message from the policy server including information indicating whether the requested cable modem resources are available for allocation.

6. The method of claim 5, wherein determining whether to grant the request for the cable modem resources comprises granting the request for cable modem resources in response to receiving a message from the policy server indicating that the requested cable modem resources are available for allocation.

7. The method of claim 5, wherein determining whether to grant the request for the cable modem resources comprises declining to grant the request for cable modem resources in response to receiving a message from the policy server indicating that the requested cable modem resources are not available for allocation.

8. The method of claim 1, comprising receiving, at the cable modem termination system, a request from the first wireless access device to de-allocate the cable modem resources allocated to the first wireless access device for the wireless connection to said at least one mobile unit in response to the first wireless access device receiving a de-allocation request from a mobility management entity.

9. The method of claim 8, wherein receiving the request to de-allocate the cable modem resources comprises receiving the de-allocation request from the first wireless access device in response to a request from a second wireless access device to release the cable modem resources allocated to said at least one mobile unit as part of a handoff from the first wireless access device to the second wireless access device.

10. The method of claim 8, wherein receiving the request to de-allocate cable modem resources comprises receiving the request from the first wireless access device in response to a call termination message provided to the first wireless access device by said at least one mobile unit.

11. The method of claim 8, comprising providing, to the policy server, a request to de-allocate the cable modem resources associated with said at least one mobile unit and the first wireless access device.

12. The method of claim 11, comprising receiving a message from the policy server including information acknowledging de-allocation of the cable modem resources associated with said at least one mobile unit and the first wireless access device.

13. The method of claim 12, comprising providing, from the cable modem termination system to the first wireless access device, information indicating release of the cable modem resources associated with said at least one mobile unit.

14. The method of claim 1, wherein receiving the request to allocate cable modem resources comprises receiving a request to allocate at least one of a bandwidth, a channel, a frequency, a code, and a timeslot provided by a cable modem.

15. The method of claim 1, wherein receiving the request to allocate cable modem resources comprises receiving a request to allocate resources for bi-directional communication during a call session between said at least one mobile unit and the first wireless access device.

16. The method of claim 1, wherein the first wireless access device initiates the wireless connection to said at least one mobile unit by transmitting a request to establish a dedicated bearer to said at least one mobile unit when the requested cable modem resources have been granted.

17. A method, comprising:

transmitting, from a wireless access device to a cable modem termination system, a request to allocate cable modem resources to the wireless access device for a wireless connection to at least one mobile unit, wherein the wireless access device determines the cable modem resources necessary to support the wireless connection at a quality of service associated with said at least one mobile unit; and initiating, at the wireless access device, the wireless connection in response to receiving an indication that the requested cable modem resources have been granted by the cable modem termination system.

18. The method of claim 17, wherein initiating the wireless connection to said at least one mobile unit comprises transmitting a request to establish a dedicated bearer to said at least one mobile unit in response to receiving information indicating that the requested cable modem resources have been granted.

* * * * *